United States Patent Office
3,016,392
Patented Jan. 9, 1962

3,016,392
16-FLUORO STEROIDS OF THE PREGNANE SERIES
Barney J. Magerlein, Portage Township, Kalamazoo County, and Robert D. Birkenmeyer and Fred Kagan, Kalamazoo, Mich., assignors to The Upjohn Company, Kalamazoo, Mich., a corporation of Delaware
No Drawing. Filed Jan. 11, 1960, Ser. No. 1,422
22 Claims. (Cl. 260—397.45)

This invention relates to novel 16α-fluoro and 16β-fluoro steroids.

The novel compounds of this invention are represented by the formula:

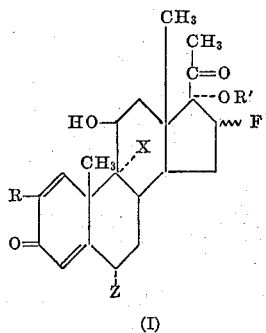

(I)

wherein R is selected from the group consisting of hydrogen and methyl, R' is hydrogen or the acyl radical of an organic carboxylic acid, particularly a hydrocarbon carboxylic acid containing from 1 to 12 carbon atoms, inclusive, X is selected from the group consisting of hydrogen and fluorine and Z is selected from the group consisting of methyl and fluorine.

In this application the wavy line appearing at the 16-position represents a generic expression including the alpha (α) and beta (β) configuration.

The compounds of Formula I possess useful therapeutic properties. They possess anti-inflammatory, glucocordticoid, progestational activity and in addition have a favorable effect on salt and water balance.

The compounds of Formula I are useful in the treatment of inflammatory conditions of mammals and birds and are particularly useful in the treatment of inflammatory conditions of the skin, eyes and ears of humans and of valuable domestic animals, as well as contact dermatitis and other allergic reactions.

Administration of the novel steroids of Formula I can be in conventional dosage forms, such as pills, tablets, capsules, syrups, or elixirs for oral use, or in liquid forms which are adaptable to the natural and synthetic cortical steroid hormones for injectable products. The novel compounds of Formula I can also be administered topically in the form of ointments, creams, lotions, and the like, with or without coacting antibiotics, germicides or other materials forming advantageous combinations therewith.

The novel 16α and 16β epimeric forms of the 16-fluoro-21-desoxy-Δ$^{1,4}$-pregnadienes, such as, 6α-methyl-16-fluoro-11β,17α-dihydroxy - 1,4-pregnadiene-3,20-dione and the 17-acylates thereof,
6α-methyl-9α,16-difluoro - 11β,17α-dihydroxy - 1,4-pregnadiene-3,20-dione,
6α,16-difluoro-11β,17α-dihydroxy - 1,4-pregnadiene-3,20-dione,
6α,9α,16-trifluoro - 11β,17α-dihydroxy - 1,4-pregnadiene-3,20-dione and the 17-acylates thereof, and 2-methy-16-fluoro-21-desoxy-Δ$^{1,4}$-pregnadienes, such as, 2,6α-dimethyl - 16-fluoro-11β,17α-dihydroxy - 1,4-pregnadiene-3,20-dione,
2,6α-dimethyl-19α,16-difluoro - 11β,17α-dihydroxy - 1,4-pregnadiene-3,20-dione,
2-methyl - 6α,16-difluoro - 11β,17α-dihydroxy - 1,4-pregnadiene-3,20-dione,
2-methyl-6α,9α,16-trifluoro-11β,17α-dihydroxy - 1,4-pregnadiene-3,20-dione, and the 17-acylates thereof, are prepared according to the following reaction scheme:

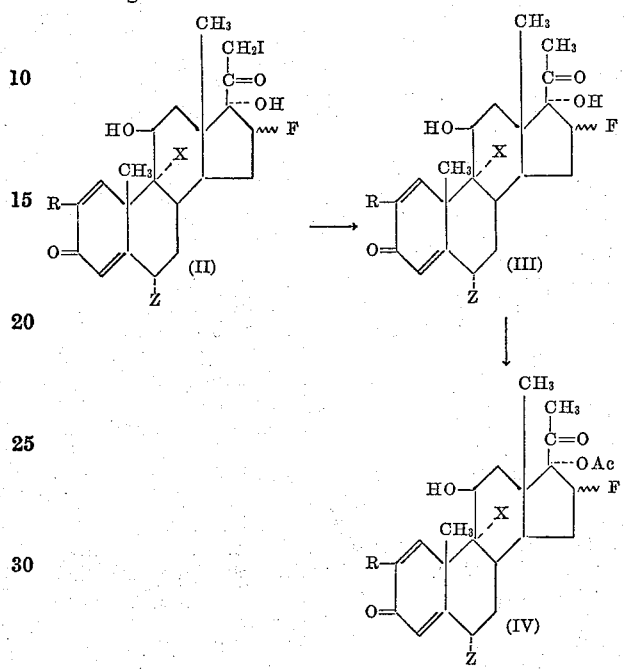

wherein Ac is the acyl radical of an organic carboxylic acid, particularly a hydrocarbon carboxylic acid containing from 1 to 12 carbon atoms, inclusive, and R, X and Z have the same meaning previously given.

This invention also relates to the 11-keto compounds, otherwise corresponding to the compounds of Formula I.

This invention further relates to those compounds, otherwise corresponding to the compounds depicted and described above, including the 11-keto compounds, in which the 6-position is unsubstituted, that is, hydrogen is present at the 6-position rather than methyl or fluorine. The 6-unsubstituted compounds possess the same activities of the 6-substituted compounds, though to a modified degree.

The starting steroids for the process of this invention, the compounds of Formula II, such as, 6α-methyl-16β-fluoro- and 6α-methyl-16α-fluoro-21-iodo-11β,17α-dihydroxy-1,4-pregnadiene-3,20-dione and 6α-methyl-9α,16β-difluoro- and 6α-methyl-9α,16α-difluoro-21-iodo-11β,17α-dihydroxy-1,4-pregnadiene-3,20-dione, are disclosed in copending application Serial No. 1,449, filed January 11, 1960, of even date herewith.

The process of the present invention comprises treating compounds of the type represented by Formula II, such as, 6α-methyl-16β-fluoro- and 6α-methyl-16α-fluoro-21-iodo-11β,17α-dihydroxy - 1,4 - pregnadiene-3,20-dione and 6α-methyl-9α,16β-difluoro- and 6α-methyl-9α,16α-difluoro-21-iodo-11β,17α-dihydroxy - 1,4 - pregnadiene-3,20-dione, with a reducing agent, such as zinc dust, sodium thiosulfate, sodium bisulfite, or the like, preferably sodium thiosulfate, in an aqueous organic solvent, for example, acetic acid, methyl alcohol, dioxane, dimethylformamide, preferably acetic acid, to obtain the compounds of Formula III, such as, 6α-methyl-16β-fluoro- and 6α-methyl-16α-fluoro-11β,17α-dihydroxy-1,4-pregnadiene-3,20-dione and 6α-methyl-9α,16β-difluoro- and 6α-methyl-9α,16α-difluoro-11β,17α-dihydroxy - 1,4-pregnadiene-3,20-dione. The thus obtained compounds of Formula III are recovered from the reaction mixture and purified by conventional methods, such as, for example, dilution of the reaction mixture with water, extraction with a water-immiscible solvent, such as, methylene chloride, ethyl acetate, benzene, toluene, and the like, or a combination of these, followed by chromatography and/or crystallization.

The compounds of Formula III are converted to the 17-acylated compounds of Formula IV, such as, 6α-methyl-16β-fluoro- and 6α-methyl-16α-fluoro-11β,17α-dihydroxy-1,4-pregnadiene-3,20-dione 21-acetate and 6α-methyl-9α,16β-difluoro- and 6α-methyl-9α,16α-difluoro-11β,17α-dihydroxy-1,4-pregnadiene-3,20-dione 21-acetate, by reacting the compounds of Formula III with formic acid or with the anhydride or halide of an acid, such as, a saturated straight-chain aliphatic acid, e.g., acetic, propionic, butyric, valeric, hexanoic, lauric, a saturated branched-chain aliphatic acid, e.g., trimethylacetic, isobutyric, isovaleric, tertiary butylacetic, a cycloaliphatic saturated acid, e.g., β-cyclopentyl-propionic, cyclohexanecarboxylic, cyclohexylacetic, an alkaryl acid, e.g., benzoic, phenylacetic, β-phenylpropionic, o-, m-, p-toluic, a saturated dibasic acid (which can be converted into water-soluble, e.g., sodium, salts), e.g., succinic, adipic, a mono-basic unsaturated acid, e.g., acrylic, crotonic, undecylenic, propiolic, undecolic, cinnamic, dibasic unsaturated acids (which can be converted into water-soluble, e.g., sodium, salts), e.g., maleic and citraconic, or the like, in the presence of an esterification catalyst, such as p-toluenesulfonic acid, sulfuric acid, perchloric acid and the like, preferably p-toluenesulfonic acid, and a solvent which is preferably the acid corresponding to the anhydride used. Inert organic solvents such as ether, dimethylformamide, tetrahydrofuran, benzene and the like, can also be used in carrying out the 17-acylation. The 17-acylation is carried out at a temperature of from about 0° to about 75° C., preferably at about 25° C. Completion of the reaction can take from several minutes to several hours depending on the temperature, the acylating agent and the steroid employed. Following the 17-acylation reaction, the compounds of Formula IV are recovered from the reaction mixture and purified by conventional methods, such as, for example, those described above for the recovery and purification of the compounds of Formula III.

The compounds of Formulas III and IV can be oxidized to the coresopnding 11-keto compounds. The oxidation can be carried out by a variety of methods, such as, for example, by oxidizing a selected steroid in acetic acid solution with chromium trioxide, using molar quantities or a slight excess, such as, from 10 to 30% excess, or by oxidizing with a haloamide or haloimide of an acid such as N-bromoacetamide, N-chlorosuccinimide or N-bromosuccinimide dissolved in pyridine, dioxane or other suitable solvents. At the conclusion of the desired oxidation reaction, the excess oxidant is generally destroyed by addition of methyl alcohol, ethyl alcohol and the like for the chromic acid oxidant or a bisulfite for N-bromoacetamide, N-bromosuccinimide and other N-halo acyl amides and imides. Thereafter, the resulting 11-keto compound is recovered by conventional means, such as, for example, those described above for the recovery and purification of the compounds of Formula III.

The following examples are illustrative of the products and process of this invention. In the examples which follow, the numeral following the name of the compound is used to indicate the relation of the compound to the reaction scheme depicted and described above.

EXAMPLE 1

6α-methyl-16α-fluoro-11β,17α-dihydroxy-1,4-pregnadiene-3,20-dione (IIIα)

400 mg. of 6α-methyl-16α-fluoro-21-iodo-11β,17α-dihydroxy-1,4-pregnadiene-3,20-dione (IIα) is dissolved in 8 ml. of acetic acid and stirred for about 45 minutes. A solution of 400 mg. of sodium thiosulfate in 4 ml. of water is added to the acetic acid solution, then 100 ml. of ice and water is added. The resulting solid is isolated by filtration, dissolved in about 40 ml. of methylene chloride and poured onto a 40 gm. Florisil (synthetic magnesium silicate) chromatographic column. The chromatographic column is developed by eluting with Skellysolve B hexanes containing increasing amounts of acetone. The eluate fractions are freed of solvent. Those fractions which on the basis of the weight profile constitute the major crystalline fraction are recrystallized from acetone to give 6α-methyl-16α-fluoro-11β,17α-dihydroxy-1,4-pregnadiene-3,20-dione (IIIα), a crystalline solid.

Similarly, substituting 6α-methyl-9α,16α-difluoro-21-iodo-11β,17α-dihydroxy-1,4-pregnadiene-3,20-dione in the above example is productive of 6α-methyl-9α,16α-difluoro-11β,17α-dihydroxy-1,4-pregnadiene-3,20-dione (IIIα), a crystalline solid.

In like manner, substituting 6α-methyl-16β-fluoro-21-iodo-11β,17α-dihydroxy-1,4-pregnadiene-3,20 - dione and 6α-methyl-9α,16β-difluoro-21-iodo-11β,17α-dihydroxy-1,4-pregnadiene-3,20-dione is productive of 6α-methyl-16β-fluoro-11β,17α-dihydroxy-1,4-pregnadiene-3,20-dione and 6α-methyl-9α,16β-difluoro - 11β,17α - dihydroxy-1,4-pregnadiene-3,20-dione.

Similarly, substituting the 16α and 16β epimeric forms of 6α,16-difluoro-21-iodo-11β,17α-dihydroxy-1,4-pregnadiene-3,20-dione, 16-fluoro-21-iodo-11β,17α-dihydroxy-1,4-pregnadiene-3,20-dione,
6α,9α,16-trifluoro-21-iodo-11β,17α-dihydroxy-1,4-pregnadiene-3,20-dione,
9α,16-difluoro-21-iodo-11β,17α-dihydroxy-1,4-pregnadiene-3,20-dione,
2,6α-dimethyl-16-fluoro-21-iodo-11β,17α-dihydroxy-1,4-pregnadiene-3,20-dione,
2-methyl-6α,16-difluoro-21-iodo-11β,17α-dihydroxy-1,4-pregnadiene-3,20-dione,
2-methyl-16-fluoro-21-iodo-11β,17α-dihydroxy-1,4-pregnadiene-3,20-dione,
2,6α-dimethyl-9α,16-difluoro-21-iodo-11β,17α-dihydroxy-1,4-pregnadiene-3,20-dione,
2-methyl-6α,9α,16-trifluoro-21-iodo-11β,17α-dihydroxy-1,4-pregnadiene-3,20-dione, and
2-methyl-9α,16-difluoro-21-iodo-11β,17α-dihydroxy-1,4-pregnadiene-3,20-dione is productive of the 16α and 16β epimeric forms of 6α,16-difluoro-11β,17α-dihydroxy-1,4-pregnadiene-3,20-dione,
16-fluoro-11β,17α-dihydroxy-1,4-pregnadiene-3,20-dione,
6α,9α,16-trifluoro-11β,17α-dihydroxy-1,4-pregnadiene-3,20-dione,
9α,16-difluoro-11β,17α-dihydroxy-1,4-pregnadiene-3,20-dione,
2,6α-dimethyl-16-fluoro-11β,17α-dihydroxy-1,4-pregnadiene-3,20-dione,
2-methyl-6α,16-difluoro-11β,17α-dihydroxy-1,4-pregnadiene-3,20-dione,
2-methyl-16-fluoro-11β,17α-dihydroxy-1,4-pregnadiene-3,20-dione,
2,6α-dimethyl-9α,16-difluoro-11β,17α-dihydroxy-1,4-pregnadiene-3,20-dione,
2-methyl-6α,9α-16-trifluoro-11β,17α-dihydroxy-1,4-pregnadiene-3,20-dione, and
2-methyl-9α,16-difluoro-11β,17α-dihydroxy-1,4-pregnadiene-3,20-dione, respectively.

EXAMPLE 2

6α-methyl-16α-fluoro-11β,17α-dihydroxy-1,4-pregnadiene-3,20-dione 17-acetate (IVα)

A solution of 2.0 g. of 6α-methyl-16α-fluoro-11β,17α-dihydroxy-1,4-pregnadiene-3,20-dione (IIIα), 5 ml. of distilled acetic anhydride, 500 mg. of p-toluenesulfonic acid, and 5 ml. of acetic acid is stirred at 25° C. under a stream of nitrogen for about 3 hours. The mixture is poured with vigorous stirring into 500 ml. of water. The precipitated solid is separated by filtration, dried, and the 6α - methyl - 16α - fluoro - 11β,17α - dihydroxy - 1,4-pregnadiene-3,20-dione 17-acetate (IVα) thus obtained is recrystallized from ethyl acetate.

Substituting another hydrocarbon carboxylic acid anhydride for the acetic anhydride is productive of other 6α-methyl - 16α - fluoro - 11β,17α - dihydroxy - 1,4 - pregnadiene-3,20-dione 17-acylates, such as, for example, the 17-propionate, the 17-butyrate, the 17-valerate, the 17-hexanoate, the 17-laurate, the 17-trimethylacetate, the 17-isobutyrate, the 17-isovalerate, the 17-tertiarybutylacetate, the 17-(β-cyclopentylpropionate), the 17-cyclohexanecarboxylate, the 17-cyclohexylacetate, the 17-benzoate, the 17-phenylacetate, the 17-(β-phenylpropionate), the 17-(o-, m-, p-toluate), the 17-hemisuccinate, the 17-hemiadipate, the 17-acrylate, the 17-crotonate, the 17-propiolate, the 17-(2-butynoate), the 17-undecolate, the 17-cinnamate, the 17-maleate, and 17-citraconate, and the like, and with formic acid, the 17-formate.

Similarly, 6α-methyl-9α,16-difluoro-11β,17α-dihydroxy-1,4 - pregnadiene - 3,20 - dione, 6α-methyl-16β-fluoro-11β,17α-dihydroxy-1,4-pregnadiene-3,20-dione and 6α-methyl-9α,16β - difluoro - 11β,17α - dihydroxy - 1,4 - pregnadiene-3,20-dione are converted to their 17-acetates and other 17-acylates, such as those named in the preceding paragraph, by substituting the appropriate steroid free 17-alcohol for 6α-methyl-16α-fluoro-11β,17α-dihydroxy-1,4-pregnadiene-3,20-dione.

Likewise, substituting the 16α and 16β epimeric forms of 6α,16-difluoro-11β,17α-dihydroxy-1,4-pregnadiene-3,20-dione, 16-fluoro-11β,17α-dihydroxy-1,4-pregnadiene-3,20-dione,
6α,9α,16-trifluoro-11β,17α-dihydroxy-1,4-pregnadiene-3,20-dione,
9α,16-difluoro-11β,17α-dihydroxy-1,4-pregnadiene-3,20-dione,
2,6α-dimethyl-16-fluoro-11β,17α-dihydroxy-1,4-pregnadiene-3,20-dione,
2-methyl-6α,16-difluoro-11β,17α-dihydroxy-1,4-pregnadiene-3,20-dione,
2-methyl-16-fluoro-11β,17α-dihydroxy-1,4-pregnadiene-3,20-dione,
2,6α-dimethyl-9α,16-difluoro-11β,17α-dihydroxy-1,4-pregnadiene-3,20-dione,
2-methyl-6α,9α,16-trifluoro-11β,17α-dihydroxy-1,4-pregnadiene-3,20-dione,
2-methyl-9α,16-difluoro-11β,17α-dihydroxy-1,4-pregnadiene-3,20-dione, respectively, is productive of the corresponding 17-acetates (or other 17-acylates described above).

EXAMPLE 3
The 11-keto compounds

A solution is prepared containing 0.5 g. of 6α-methyl-16α - fluoro - 11β,17α - dihydroxy - 1,4 - pregnadiene - 3,20-dione, 0.15 g. of chromium trioxide, 10 ml. of glacial acetic acid and ½ ml. of water. This mixture is stirred and maintained at room temperature for about 8 hours. Thereafter, the excess oxidant is destroyed by addition of methanol and the mixture is poured into 50 ml. of ice water. The resulting precipitate is collected on a filter and recrystallized from ethyl acetate to give 6α-methyl-16α-fluoro-17α-hydroxy-1,4-pregnadiene-3,11,20-trione, a crystalline solid.

Similarly, the 17-acylates of 6α-methyl-16α-fluoro-11β,17α-dihydroxy-1,4-pregnadiene-3,20-dione are converted to the 17-acylates of 6α-methyl-16α-fluoro-17α-hydroxy-1,4-pregnadiene-3,11,20-trione.

In like manner, 6α-methyl-16β-fluoro-11β,17α-dihydroxy-1,4-pregnadiene-3,20-dione (and the 17-acylates thereof), and 6α-methyl-9α,16β-difluoro- and 6α-methyl-9α,16α-difluoro - 11β,17α - dihydroxy - 1,4 - pregnadiene-3,20-dione (and the 17-acylates thereof) are converted to 6α-methyl-16β-fluoro-17α-hydroxy-1,4-pregnadiene-3,11,20-trione (and the 17-acylates thereof) and 6α-methyl-9α,16β-difluoro- and 6α-methyl-9α,16α-difluoro-17α-hydroxy-1,4-pregnadiene-3,11,20-trione (and the 17-acylates thereof).

Likewise, substituting the 16α and 16β epimeric forms of 6α,16 - difluoro-11β,17α-dihydroxy-1,4-pregnadiene-3,20-dione (and the 17-acylates thereof)

16-fluoro-11β,17α-dihydroxy-1,4-pregnadiene-3,20-dione (and the 17-acylates thereof),
6α,9α,16-trifluoro-11β,17α-dihydroxy-1,4-pregnadiene-3,20-dione (and the 17-acylates thereof),
9α,16-difluoro-11β,17α-dihydroxy-1,4-pregnadiene-3,20-dione (and the 17-acylates thereof),
2,6α-dimethyl-16-fluoro-11β,17α-dihydroxy-1,4-pregnadiene-3,20-dione (and the 17-acylates thereof),
2-methyl-6α,16-difluoro-11β,17α-dihydroxy-1,4-pregnadiene-3,20-dione (and the 17-acylates thereof),
2-methyl-16-fluoro-11β,17α-dihydroxy-1,4-pregnadiene-3,20-dione (and the 17-acylates thereof),
2,6α-dimethyl-9α,16-difluoro-11β,17α-dihydroxy-1,4-pregnadiene-3,20-dione (and the 17-acylates thereof),
2-methyl-6α,9α,16-trifluoro-11β,17α-dihydroxy-1,4-pregnadiene-3,20-dione (and the 17-acylates thereof), and
2-methyl-9α,16-difluoro-11β,17α-dihydroxy-1,4-pregnadiene-3,20-dione (and the 17-acylates thereof)

is productive of the 16α and 16β epimeric forms of

6α,16-difluoro-17α-hydroxy-1,4-pregnadiene-3,11,20-trione (and the 17-acylates thereof),
16-fluoro-17α-hydroxy-1,4-pregnadiene-3,11,20-trione (and the 17-acylates thereof),
6α,9α,16-trifluoro-17α-hydroxy-1,4-pregnadiene-3,11,20-trione (and the 17-acylates thereof),
9α,16-difluoro-17α-hydroxy-1,4-pregnadiene-3,11,20-trione (and the 17-acylates thereof),
2,6α-dimethyl-16-fluoro-17α-hydroxy-1,4-pregnadiene-3,11,20-trione (and the 17-acylates thereof),
2-methyl-6α,16-difluoro-17α-hydroxy-1,4-pregnadiene-3,11,20-trione (and the 17-acylates thereof),
2-methyl-16-fluoro-17α-hydroxy-1,4-pregnadiene-3,11,20-trione (and the 17-acylates thereof),
2,6α-dimethyl-9α,16-difluoro-17α-hydroxy-1,4-pregnadiene-3,11,20-trione (and the 17-acylates thereof),
2-methyl-6α,9α,16-trifluoro-17α-hydroxy-1,4-pregnadiene-3,11,20-trione (and the 17-acylates thereof), and
2-methyl-9α,16-difluoro-17α-hydroxy-1,4-pregnadiene-3,11,20 - trione (and the 17-acylates thereof), respectively.

The above described 16-fluoro-11-keto compounds possess the same activities as the corresponding 16-fluoro-11β-hydroxy compounds, though to a modified degree.

We claim:
1. A 16-fluoro steroid represented by the formula:

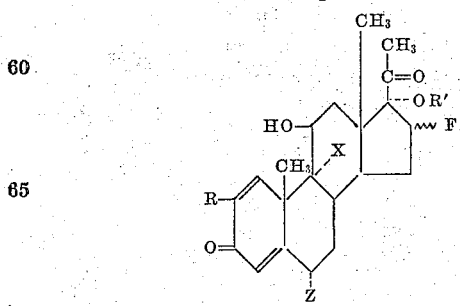

wherein R is selected from the group consisting of hydrogen and methyl, R' is selected from the group consisting of hydrogen and the acyl radical of a hydrocarbon carboxylic acid containing from 1 to 12 carbon atoms, inclusive, X is selected from the group consisting of hydrogen and fluorine, and Z is selected from the group consisting of methyl and fluorine.

2. 6α-methyl-16-fluoro-11β,17α-dihydroxy-1,4-pregnadiene-3,20-dione and the 17-acylates thereof, wherein the acyl radical is that of a hydrocarbon carboxylic acid containing from 1 to 12 carbon atoms, inclusive.

3. 6α-methyl-16α-fluoro-11β,17α-dihydroxy-1,4-pregnadiene-3,20-dione.

4. 6α-methyl-16α-fluoro-11β,17α-dihydroxy-1,4-pregnadiene-3,20-dione 17-acetate.

5. 6α-methyl - 9α,16 - difluoro-11β,17α-dihydroxy-1,4-pregnadiene-3,20-dione and the 17-acylates thereof, wherein the acyl radical is that of a hydrocarbon carboxylic acid containing from 1 to 12 carbon atoms, inclusive.

6. 6α-methyl-9α,16α-difluoro-11β,17α-dihydroxy-1,4-pregnadiene-3,20-dione.

7. 6α-methyl-9α,16α-difluoro-11β,17α-dihydroxy-1,4-pregnadiene-3,20-dione 17-acetate.

8. 6α,16-difluoro-11β,17α-dihydroxy-1,4-pregnadiene-3,20-dione and the 17-acylates thereof, wherein the acyl radical is that of a hydrocarbon carboxylic acid containing from 1 to 12 carbon atoms, inclusive.

9. 6α,16α-difluoro-11β,17α-dihydroxy-1,4-pregnadiene-3,20-dione.

10. 6α,16α-difluoro-11β,17α-dihydroxy-1,4-pregnadiene-3,20-dione 17-acetate.

11. 6α,9α,16-trifluoro-11β,17α-dihydroxy-1,4-pregnadiene-3,20-dione and the 17-acylates thereof, wherein the acyl radical is that of a hydrocarbon carboxylic acid containing from 1 to 12 carbon atoms, inclusive.

12. 6α,9α,16α-trifluoro-11β,17α-dihydroxy-1,4-pregnadiene-3,20-dione.

13. 6α,9α,16α-trifluoro-11β,17α-dihydroxy-1,4-pregnadiene-3,20-dione 17-acetate.

14. A 16-fluoro steroid represented by the formula:

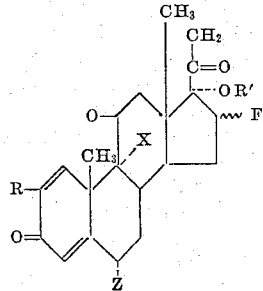

wherein R is selected from the group consisting of hydrogen and methyl, R' is selected from the group consisting of hydrogen and the acyl radical of a hydrocarbon carboxylic acid containing from 1 to 12 carbon atoms, inclusive, X is selected from the group consisting of hydrogen and fluorine, and Z is selected from the group consisting of methyl and fluorine.

15. A 16-fluoro steroid represented by the formula:

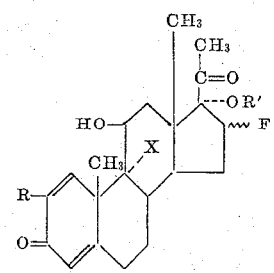

wherein R is selected from the group consisting of hydrogen and methyl, R' is selected from the group consisting of hydrogen and the acyl radical of a hydrocarbon carboxylic acid containing from 1 to 12 carbon atoms, inclusive, and X is selected from the group consisting of hydrogen and fluorine.

16. 16 - fluoro - 11β,17α - dihydroxy - 1,4 - pregnadiene-3,20-dione and the 17-acylates thereof, wherein the acyl radical is that of a hydrocarbon carboxylic acid containing from 1 to 12 carbon atoms, inclusive.

17. 16α - fluoro - 11β,17α - dihydroxy - 1,4 - pregnadiene-3,20-dione.

18. 16α - fluoro - 11β,17α - dihydroxy - 1,4 - pregnadiene-3,20-dione 17-acetate.

19. 9α,16 - difluoro - 11β,17α - dihydroxy - 1,4 - pregnadiene-3,20-dione and the 17-acylates thereof, wherein the acyl radical is that of a hydrocarbon carboxylic acid containing from 1 to 12 carbon atoms, inclusive.

20. 9α,16α - difluoro - 11β,17α - dihydroxy - 1,4 - pregnadiene-3,20-dione.

21. 9α,16α - difluoro - 11β,17α - dihydroxy - 1,4 - pregnadiene-3,20-dione 17-acetate.

22. A 16-fluoro steroid represented by the formula:

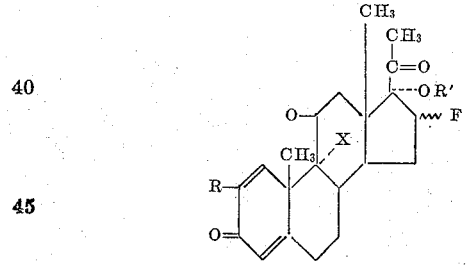

wherein R is selected from the group consisting of hydrogen and methyl, R' is selected from the group consisting of hydrogen and the acyl radical of a hydrocarbon carboxylic acid containing from 1 to 12 carbon atoms, inclusive, and X is selected from the group consisting of hydrogen and fluorine.

References Cited in the file of this patent
UNITED STATES PATENTS

| | | |
|---|---|---|
| 2,864,838 | Lincoln et al. | Dec. 16, 1958 |
| 2,865,935 | Schneider et al. | Dec. 23, 1958 |

UNITED STATES PATENT OFFICE
CERTIFICATION OF CORRECTION

Patent No. 3,016,392           January 9, 1962

Barney J. Magerlein et al.

It is hereby certified that error appears in the above numbered patent requiring correction and that the said Letters Patent should read as corrected below.

Column 1, lines 40 and 41, for "glucocordticoid" read -- glucocorticoid --; line 68, for "2-methy-" read -- 2-methyl- --; same column 1, line 71, for "-19α,16-" read ---9α,16- --; column 3, line 46, for "corresopnding" read -- corresponding --; column 4, line 64, for "-6α,9α-16-" read ---6α,9α,16- --; column 7, lines 38 to 50, the formula should appear as shown below instead of as in the patent:

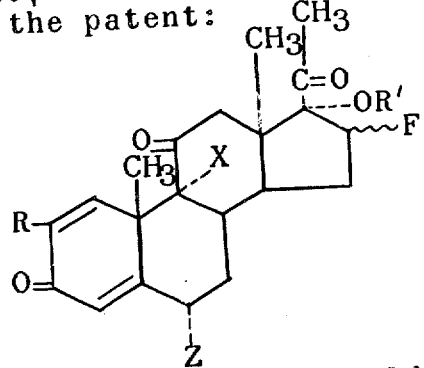

column 8, lines 36 to 47, the formula should appear as shown below instead of as in the patent:

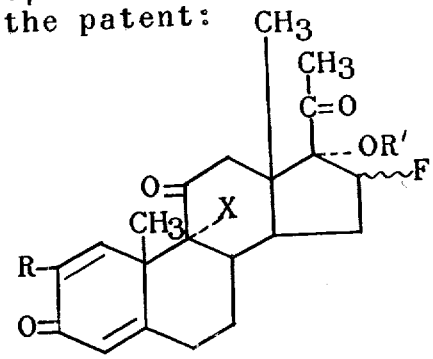

Signed and sealed this 22nd day of May 1962.

(SEAL)
Attest:

ERNEST W. SWIDER
Attesting Officer

DAVID L. LADD
Commissioner of Patents